Figure 1:
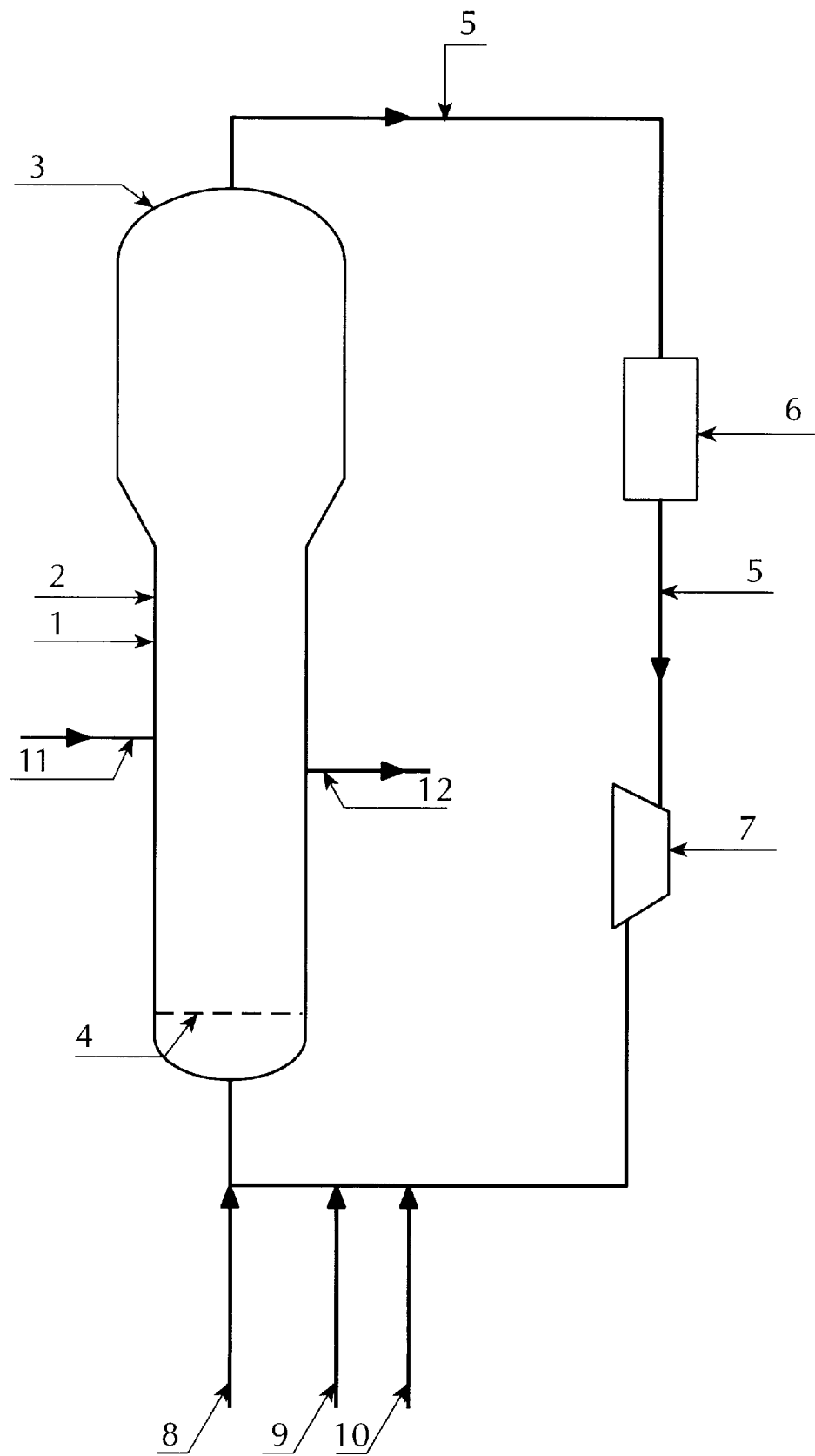

United States Patent [19]
Gelus

[11] Patent Number: 5,990,251
[45] Date of Patent: *Nov. 23, 1999

[54] PROCESS FOR POLYMERISING OLEFIN WITH A ZIEGLER-NATTA CATALYST

[75] Inventor: Emmanuel Gelus, Lavera, France

[73] Assignee: BP Chemicals Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,400

[22] Filed: Jan. 27, 1997

Related U.S. Application Data

[63] Continuation of application No. 08/312,283, Sep. 26, 1994, abandoned.

[51] Int. Cl.[6] ................................ C08F 4/649; C08F 2/34
[52] U.S. Cl. .................... 526/125.7; 526/125.2; 526/144; 526/901
[58] Field of Search ............................ 526/125.2, 125.7, 526/901, 144

[56] References Cited

U.S. PATENT DOCUMENTS

| | | | |
|---|---|---|---|
| 4,593,010 | 6/1986 | Malpass | 526/125.7 |
| 5,118,769 | 6/1992 | Kondo et al. | 526/125.7 |

FOREIGN PATENT DOCUMENTS

| | | | |
|---|---|---|---|
| 529977 | 3/1993 | European Pat. Off. | |
| 56-104907 | 8/1981 | Japan . | |
| 61-127703 | 6/1986 | Japan | 526/125.7 |

OTHER PUBLICATIONS

Translation of Toyo —Japanese No. 61–127703.
English translation furnished.

*Primary Examiner*—Fred Teskin
*Attorney, Agent, or Firm*—Morgan & Finnegan, L.L.P.

[57] ABSTRACT

The present invention relates to a process for (co-)polymerizing olefin(s) comprising introducing into a polymerization medium the olefin(s), a titanium-based catalyst of Ziegler-Natta type, an organometallic cocatalyst and a halogenated hydrocarbon compound in an amount effective for increasing the catalyst activity in the (co-)polymerization, the amount being such that the molar ratio of the quantity of the halogenated hydrocarbon compound to that of titanium is comprised between 0.01 and 0.1, or between 0.001 and 0.15 when the (co-)polymerization is carried out continuously. The process is particularly useful in a continuous gas-phase (co-)polymerisation of olefin(s).

6 Claims, 2 Drawing Sheets

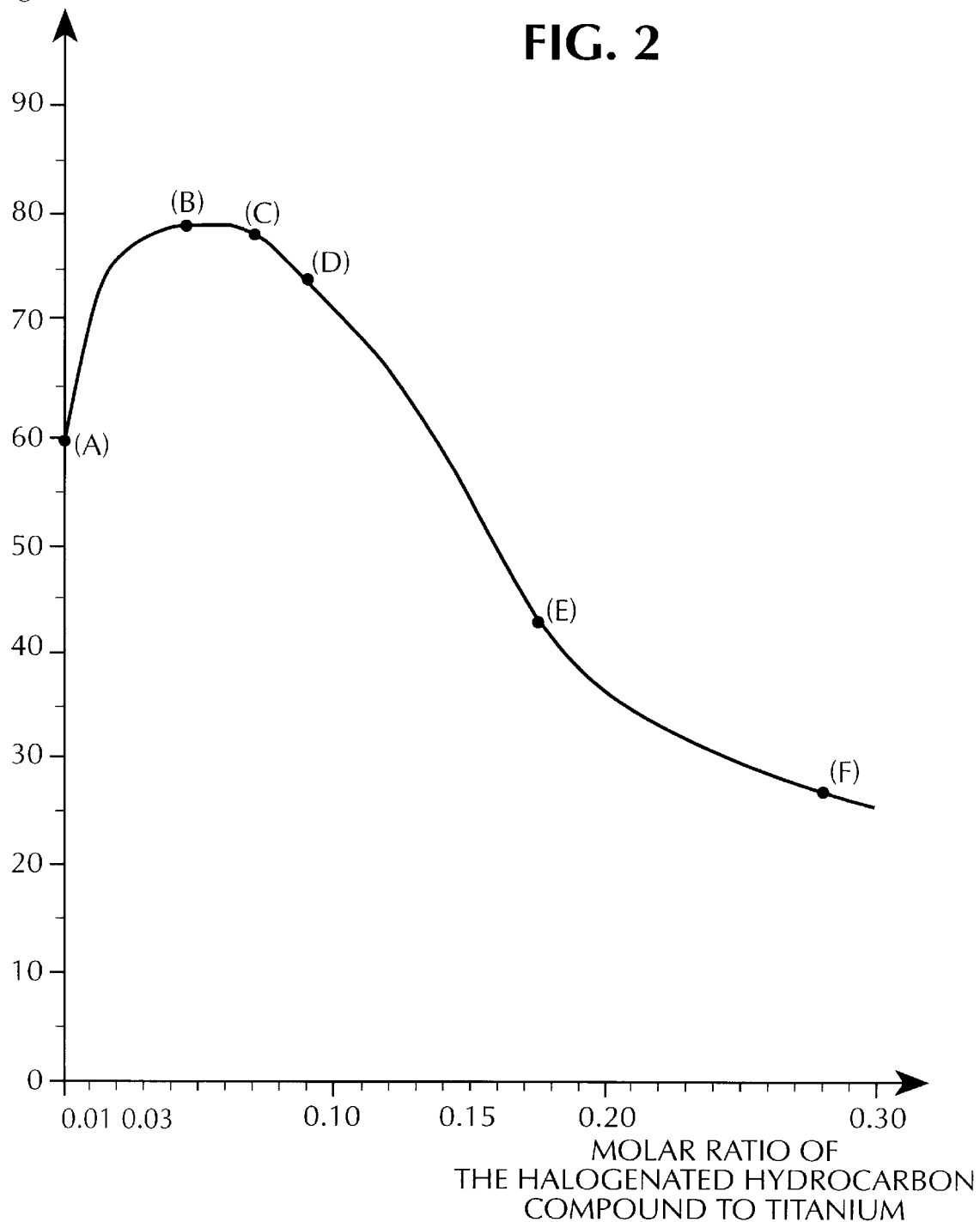

PROCESS FOR POLYMERISING OLEFIN WITH A ZIEGLER-NATTA CATALYST

This application is a continuation of application Ser. No. 08/312,283, filed Sep. 26, 1994 abandoned.

The present invention relates to a process for polymerizing olefin(s) in the presence of a catalyst of Ziegler-Natta type and particularly to the use of halogenated hydrocarbon compounds as catalyst activating agents in an olefin polymerization in the presence of titanium-based catalyst of Ziegler-Natta type.

It is known to polymerize olefins e.g. ethylene, especially by a gas phase polymerization process with the aid of a catalyst of Ziegler-Natta type and an organometallic cocatalyst. When the catalyst is highly active, especially when it is employed in the presence of a large quantity of cocatalyst, a formation of polymer agglomerates, which may be considerable, can be observed.

Patent Application EP-A-0 529 977 discloses a gas phase polymerization of ethylene carried out with the aid of a Ziegler-Natta type catalyst containing titanium, in the presence of a halogenated hydrocarbon compound which enables the formation of ethane to be substantially reduced. Under the conditions used in the process disclosed by this Patent Application, no substantial variation of the average activity of the catalyst is observed.

A process has now been found which makes it possible to increase appreciably the activity of a catalyst for olefin polymerization. When the process is carried out, practically no formation of polymer agglomerates is found, even when the catalyst is highly active and is used in the presence of a relatively large quantity of cocatalyst.

The subject of the present invention is therefore a process for (co-)polymerizing one or more olefins, comprising introducing into a polymerization medium the olefin(s), a titanium-based catalyst of Ziegler-Natta type, an organometallic cocatalyst and a halogenated hydrocarbon compound, characterized in that the (co-)polymerization is carried out continuously and the halogenated hydrocarbon compound is introduced in an amount effective for increasing the catalyst activity in the (co-)polymerization, the amount being such that the molar ratio of the quantity of the halogenated hydrocarbon compound to that of titanium introduced into the polymerization medium is comprised between 0.001 and 0.15, e.g. greater than 0.001 and lower than 0.15.

According to another aspect, the present invention relates to a process for (co-)polymerizing one or more olefins, comprising introducing into a polymerization medium the olefin(s), a titanium-based catalyst of Ziegler-Natta type, an organometallic cocatalyst and a halogenated hydrocarbon compound, characterized in that the halogenated hydrocarbon compound is introduced in an amount effective for increasing the catalyst activity in the (co-)polymerization, the amount being such that the molar ratio of the quantity of the halogenated hydrocarbon compound to that of titanium introduced into the polymerization medium is comprised between 0.01 and 0.1, e.g. greater than 0.01 and lower than 0.1. Preferably, the (co-)polymerization is carried out continuously.

According to another embodiment, the present invention also relates to the use of a halogenated hydrocarbon compound as a catalyst activating agent in a (co-)polymerization of one or more olefin(s) carried out in the presence of a titanium-based catalyst of Ziegler-Natta type and an organometallic cocatalyst, the halogenated hydrocarbon compound being used in an amount such that the molar ratio of the quantity of the halogenated hydrocarbon compound to that of titanium is comprised between 0.001 and 0.15, e.g. greater than 0.001 and lower than 0.15. Preferably, the (co-)polymerization is carried out continuously.

FIG. 1 diagrammatically represents a fluidized bed reactor for performing a gas phase (co-)polymerization of ethylene according to Example 1 of the present specification.

FIG. 2 represents a graph of the catalyst activity (expressed in gramme of (co-)polymer produced per millimole of titanium, per hour of reaction and per 0.1 MPa of ethylene) versus the molar ratio of chloroform to titanium introduced into the polymerization medium during Runs A to F of Example 3 of the present specification.

According to the process of the invention a halogenated hydrocarbon compound is employed to increase the activity of a titanium-based catalyst of Ziegler-Natta type. This activity represents the quantity of polymer manufactured under given reaction conditions. For example, the catalyst activity can be measured as the quantity of polymer manufactured per millimole of titanium, per hour of reaction and per 0.1 MPa of olefin pressure.

The halogenated hydrocarbon compound may be a chlorinated or brominated hydrocarbon. It may be a monohalogenated hydrocarbon, e.g. corresponding to the general formula R-X in which R denotes an alkyl group containing from 1 to 10, preferably from 1 to 4 carbon atoms, an aralkyl or aryl group containing from 6 to 14, preferably from 6 to 10 carbon atoms, and X denotes a halogen atom such as chlorine or bromine. The halogenated hydrocarbon compound may also be a polyhalogenated hydrocarbon, preferably containing 2 to 6, e.g. 2 to 4 halogen atoms such as chlorine or bromine, and 1 to 14, e.g. 1 to 4 carbon atoms per 1 molecule. Preferably it may also be a mono- or poly halogenated saturated hydrocarbon, such as the halogenated hydrocarbon compounds previously mentioned, e.g. methylene chloride, chloroform, carbon tetrachloride, trichloro-1,1,1 ethane or dichloro-1,2 ethane. Chloroform is employed most frequently.

The halogenated hydrocarbon compound may be introduced into the polymerization medium as it is or preferably diluted in a liquid hydrocarbon such as an alcane e.g. isopentane, n-pentane, n-hexane or n-heptane.

The halogenated hydrocarbon compound is very advantageously employed in a (co-)polymerization reaction in a quantity such that the molar ratio of the quantity of halogenated hydrocarbon to the quantity of titanium introduced into the polymerization medium is comprised between 0.001 and 0.15, preferably between 0.01 and 0.1 or between 0.03 and 0.1, and more particularly from 0.03 to 0.095, e.g. from 0.031 to 0.091. When these quantities of the halogenated hydrocarbon compound are used, a large increase in the activity of the catalyst is found, surprisingly. It is in general at least 10%. In most cases it may be greater than 20% and even greater than 100%. The increase in the activity of the catalyst is found in particular when the (co-)polymerization reaction is carried out continuously, especially in a gas phase polymerization process.

A continuous (co-)polymerization of one or more olefins e.g. containing from 2 to 8 carbon atoms, such as ethylene or ethylene with at least one $C_3$–$C_8$ olefin, generally comprises continuously introducing the olefin(s) into the polymerization medium which is preferably at a temperature below the melting point of the (co-)polymer, e.g. from 30 to 120° C., preferably from 50 to 110° C. or from 60 to 100° C., and under a pressure of from 0.1 to 5 MPa, preferably from 0.5 to 4 MPa, e.g. from 1 to 3 MPa. It also comprises continuously or semi-continuously, e.g. intermittently, introducing the catalyst and the organometallic cocatalyst into the polymerization medium, and continuously or semi-continuously, e.g. intermittently, discharging the polymer produced from the polymerization medium. If required, a molecular weight regulator, e.g. hydrogen, may be continuously introduced into the polymerization medium. Preferably, the catalyst and the halogenated hydrocarbon compound may be used or introduced into the polymerization medium in order to maintain the molar ratio of the quantity of the halogenated hydrocarbon compound to that of titanium introduced at a substantially constant value selected in the above-mentioned ranges.

The polymerization medium may be a liquid hydrocarbon diluent which forms with the catalyst and the (co-)polymer a suspension. It may be an alcane or a cycloalcane or a mixture of alcanes or cycloalcanes, e.g. containing from 3 to 10, preferably from 4 to 8 carbon atoms, e.g. n-hexane. It also may be a gaseous phase containing one or more olefins, optionally mixed with hydrogen and inert gas.

Preferably the polymerization process is a continuous gas-phase (co-)polymerization of one or more olefins e.g. containing from 2 to 8 carbon atoms, such as ethylene or ethylene with at least one $C_3$–$C_8$ olefin. In that case, the polymerization medium comprises an olefin stream upwardly passing through an agitated bed of finely divided (co-)polymer, with removal of the heat of the (co-)polymerization by cooling the olefin stream which is then recycled to the agitated bed. The agitated bed may be a stirred bed or preferably a fluidized bed wherein the olefin stream is the fluidization gas maintaining the finely divided (co-)polymer in a fluidized state. The olefin stream may comprise one or more olefins, e.g. ethylene or a mixture of ethylene with at least one $C_3$–$C_8$ olefin, a molecular weight regulator, e.g. hydrogen, and an inert gas e.g. nitrogen or at least one $C_1$–$C_8$ alcane, preferably at least one $C_2$–$C_6$ alcane.

In the present invention, particularly when a continuous (co-)polymerization of olefin(s) is carried out, the halogenated hydrocarbon compound preferably is continuously introduced into the polymerization medium, e.g. in the form of a solution in a liquid hydrocarbon such as an alcane, a cycloalcane or a mixture thereof e.g. containing from 3 to 10, preferably from 4 to 8 carbon atoms. The halogenated hydrocarbon compound may be used in the form of a solution of from 0.1 to 100%, preferably from 1 to 50% by weight in a liquid alcane or cycloalcane.

When the molar ratio of the quantity of the halogenated hydrocarbon compound to the quantity of titanium introduced into the polymerization medium is too high, it is found that the activity of the catalyst is not appreciably modified, or even is substantially reduced, particularly in a continuous polymerization process. When this ratio is too low, no substantial modification in the catalyst activity is found compared with a process carried out in the absence of halogenated hydrocarbon compound.

Furthermore, the halogenated hydrocarbon compound may also be employed in a quantity such that the molar ratio of the quantity of the halogenated hydrocarbon compound to the total quantity of cocatalyst introduced into the polymerization medium is comprised between 0.001 and 0.5, preferably between 0.005 and 0.25 and in particular between 0.005 and 0.15, e.g. from 0.01 to 0.15. Preferably, the cocatalyst and the halogenated hydrocarbon compound may be used or introduced into the polymerization medium in order to maintain the molar ratio of the quantity of the halogenated hydrocarbon compound to that of the cocatalyst introduced at a substantially constant value selected in the above-mentioned ranges.

The polymerization catalyst is a titanium-based catalyst, which means that it contains substantially no other transition metals and in particular that it contains substantially no vanadium.

The catalyst may be a catalyst containing essentially atoms of titanium, halogen and magnesium and optionally a refractory oxide e.g. silica or alumina. It may be prepared by a method comprising a reaction between magnesium metal, at least one halogenated hydrocarbon and at least one tetravalent titanium compound. Such a method is described, for example, in French Patents No. 2,099,311 and No. 2,116,698.

The catalyst may comprise a granular support based especially on a refractory oxide such as, for example, silica and/or alumina. Such a catalyst can be prepared by a method comprising bringing the granular support into contact with (a) a dialkylmagnesium and optionally a trialkylaluminium, (b) a halogenated hydrocarbon e.g. a monohalogenated hydrocarbon, (c) and a tetravalent titanium compound. Such a method is described in European Patent Application EP-A-453,088.

The catalyst may also contain a magnesium chloride support and in particular a preactived support such as that described in European Patent Application EP-A-336,545. A catalyst of this type can be prepared by a method comprising bringing a magnesium chloride support into contact with (a) an organometallic compound which is a reducing agent for titanium, (b) a tetravalent titanium compound and c) optionally one or more electron-donor compounds. Such a method is described in French Patent Application FR-A-2,669,640.

The catalyst may be used in the form of a solid as it is or in the form of a prepolymer, especially when it is used in a gas phase polymerization. The prepolymer is obtained by bringing the catalyst into contact with one or more of olefins e.g. containing from 2 to 8 carbon atoms such as, for example, ethylene or a mixture of ethylene with $C_3$–$C_8$ olefin(s) in the presence of an organometallic cocatalyst. In general, the prepolymer obtained contains from 0.1 to 200 g preferably from 10 to 100 g of polymer per millimole of titanium.

The catalyst is employed with an organometallic cocatalyst which may be chosen from organoaluminium, organomagnesium and organozinc compounds. In most cases the organometallic cocatalyst is an alkylaluminium such as, for example, trimethylaluminium, triethylaluminium, tri-n-octylaluminium or else a mixture of these compounds.

According to the invention the organometallic cocatalyst may be employed in a relatively large quantity and in particular so that the molar ratio of the total quantity of the organometallic cocatalyst to the quantity of titanium introduced into the polymerization medium is comprised between 0.5 and 100, preferably between 0.7 and 40, more particularly between 1.2 and 20 e.g. between 1.5 and 10.

The organometallic cocatalyst may be introduced continuously or semi-continuously, i.e. intermittently, into the polymerization medium as a mixture with the catalyst as, for example, in a prepolymer, or separately from the catalyst. According to a particular method, a portion of the organometallic cocatalyst is introduced into the polymerization medium as a mixture with the catalyst and another portion is introduced separately from the catalyst. It is possible, for example, to employ a prepolymer containing a quantity of the organometallic cocatalyst such that the molar ratio of the quantity of the organometallic cocatalyst to the quantity of titanium is comprised between 0.5 and 5 preferably between 1 and 4 and to add to the polymerization medium separately a quantity of the organometallic cocatalyst such that the molar ratio of the added quantity of the cocatalyst to the quantity of titanium is between 1 and 10.

The (co-)polymerization reaction may be carried out in suspension in a liquid hydrocarbon. However, it is very advantageously carried out in gaseous phase, according to known processes, in a reactor containing a mechanically stirred and/or fluidized bed, especially in the equipment described in French Patents No. 2,207,145 and No. 2,335,526.

In a gas phase (co-)polymerization, the olefin stream may contain hydrogen in a quantity such that the molar ratio of the quantity of hydrogen to the total quantity of olefin(s) used is comprised between 0.05 and 1, preferably between 0.15 and 0.5. However, this ratio may be higher than 1 particularly when a (co-)polymer of a high melt index is manufactured, for example a (co-)polymer of a melt index $MI_{2.16}$ (measured at 190° C. under a 2.16 kg load) higher than 50 g/10 minutes.

According to the process of the invention it is possible to prepare ethylene (co-)polymers containing optionally one or more alpha-olefins, e.g. containing from 3 to 8 carbon atoms such as, for example, 1-butene, 1-hexene, 4-methyl-1-pentene or 1-octene. These (co-)polymers may have a density ranging from 0.965 to 0.910. The invention is particularly advantageous for manufacturing copolymers of ethylene with at least one alpha-olefin e.g. $C_3$–$C_8$ alpha-olefin, copolymers having a density ranging from 0.948 to 0.960 and a melt index $MI_{2.16}$ ranging from 2 to 25 g/10 minutes. It also makes it possible to manufacture, in good conditions, ethylene copolymers which have a density ranging from 0.914 to 0.930 and a melt index $MI_{2.16}$ ranging from 0.5 to 25 g/10 minutes.

The (co)polymers obtained by the process have a particularly low titanium content which may be lower than 15 ppm, or even lower than 10 ppm and, in most cases, lower than 5 ppm e.g. from 1 to 5 ppm. Furthermore, these (co)polymers surprisingly have a higher melt index when compared with the (co-)polymers obtained in identical conditions but in the absence of the halogenated hydrocarbon compound. In particular, the melt index measured at 190° C. under a 2.16 kg load may be doubled. The melt index may vary in parallel with the activity of the catalyst.

Furthermore, the (co)polymers obtained by the process of the invention may also have a content of soluble polymer which is lower than the (co)polymers obtained in the absence of the halogenated hydrocarbon compound. This result is observed in particular when the (co)polymers are obtained with the aid of a catalyst essentially containing atoms of titanium, halogen and magnesium e.g. prepared by a reaction between magnesium metal, a halogenated hydrocarbon and at least one compound of tetravalent titanium. The drop in the content of soluble polymer may be greater than 20%. According to the present invention the content of soluble polymer of a (co)polymer is measured after the (co)polymer has been kept in n-hexane at 50° C. for 2 hours. This content is expressed in weight %.

Advantageously, the (co-)polymers obtained by the process of the invention may also have a content of oligomers substantially reduced compared to (co-)polymers obtained in the absence of the halogenated hydrocarbon compound. In most cases, it was also found that the molecular weight distribution of the (co-)polymers is narrowed compared to (co-)polymers obtained in the absence of the halogenated hydrocarbon compound.

The following examples illustrate the present invention.

EXAMPLE 1 a) Preparation of a Catalyst 4.6 m³ of n-hexane, 5.5 kg of iodine, 3160 moles of magnesium, 29 moles of isobutanol, 60 moles of titanium tetra-n-propoxide and 60 moles of n-butyl chloride were introduced into a 10-m³ reactor fitted with a mechanical stirring system rotating at 150 revolutions per minute. The reactor was then heated to a temperature of 85° C. until the reaction began and then to 80° C. At this temperature 400 moles of titanium tetrachloride, 340 moles of titanium tetra-n-propoxide were introduced into the reactor, followed by 4700 moles of n-butyl chloride over 240 minutes. The mixture thus obtained was then kept stirred at 80° C. for 2 hours. A catalyst was thus obtained as a suspension in n-hexane.

b) Preparation of a Prepolymer 500 liters of n-hexane, 4 moles of tri-n-octylaluminium and a quantity of catalyst prepared previously containing 2.5 moles of titanium were introduced into a 1.5-m³ stainless steel reactor maintained under nitrogen atmosphere and provided with a stirring device rotating at 150 revolutions per minute and heated to 70° C. Hydrogen was then introduced into it so as to obtain a partial pressure of 0.1 MPa, and ethylene at a steady flow rate of 15 kg/h for 6 hours and 40 minutes. At the end of this time, the reactor was degassed and its content was transferred into a mechanically stirred evaporator in which the n-hexane was removed by a circulation of nitrogen heated to 70° C. 100 kg of a prepolymer containing 40 g of polyethylene per millimole of titanium were then obtained.

c) Manufacture of a Copolymer of ethylene and 1-hexene

The operation was carried out in a gas phase polymerization reactor (1) as shown in FIG. 1, consisting essentially of a vertical cylinder (2) of 75 cm diameter and with a height of 6 m, with a disengagement chamber (3) above it, fitted in its lower part with a fluidization grid (4) and a recycling conduit (5) connecting the top of the disengagement chamber to the lower part of the reactor situated under the fluidization grid, the recycling conduit (5) being equipped with a heat exchanger (6), a compressor (7) and feed conduits for ethylene (8), for 1-hexene (9) and for hydrogen (10). The reactor was also equipped with a feed conduit for prepolymer (11) and a conduit for drawing off copolymer (12).

The reactor contained a fluidized bed of particles of polymer being formed, which had a height of 2.5 m and through which passed a stream of a reaction gas mixture which had an upward velocity of 45 cm/s, an absolute pressure of 1.7 MPa and a temperature, measured at the outlet of the disengagement chamber, of 80° C.

The reaction gas mixture comprised, by volume, 15% of ethylene, 2.6% of 1-hexene, 3.5% of hydrogen and 78.9% of nitrogen.

The reactor was fed with prepolymer prepared previously at a rate of 650 g/h. It was fed separately with triethylaluminium at a rate of 40 millimoles per hour. Furthermore, it was continuously fed with chloroform at a rate of 0.7 millimoles per hour. The molar ratio of the quantities of chloroform and titanium introduced into the reactor was therefore 0.043.

Under these conditions an ethylene polymer free from agglomerate was drawn off at a rate of 62 kg/h, which had a density of 0.918, a titanium content of 12 ppm, a melt index $M_{2.16}$ of 1.3 g/10 minutes, and which contained approximately 10% by weight of 1-hexene. The catalyst activity was 310 g of polymer per millimole of titanium per hour of reaction and per 0.1 MPa of ethylene pressure (g/mM/h/0.1 MPa).

EXAMPLE 2 (COMPARATIVE)
Manufacture of a Copolymer of ethylene and 1-hexene

The operation was carried out exactly as in Example 1(c) except for the fact that no chloroform was employed during the copolymerization reaction. Under these conditions the catalyst activity was 240 g/mM/h/0.1 MPa.

EXAMPLE 3
a) Preparation of a Catalyst

The operation was carried out exactly as in Example 1, apart from introducing 48 moles of dimethylformamide into the mixture obtained at the end of the preparation and stirred at 80° C. The mixture thus obtained was then kept stirred at 80° C. for 2 hours. At the end of this period, the mixture was cooled to 20° C. and a catalyst was thus obtained as a suspension in n-hexane.

b) Preparation of a Prepolymer

The operation was carried out exactly as in Example 1, apart from using 3 moles of tri-n-octylaluminium and a quantity of catalyst prepared previously containing 2.5 moles of titanium.

c) Manufacture of a Copolymer of ethylene and 1-butene

The operation was carried out exactly as in Example 1, apart from using a gas phase polymerization reactor having a diameter of 90 cm, a fluidized bed of polymer of 380 kg and a stream of reaction gas mixture having an upward velocity of 37 cm/s, an absolute pressure of 1.9 MPa, a temperature of 94° C. and a composition comprising by volume 47.4% of ethylene, 2.3% of 1-butene, 29.4% of hydrogen and 20.9% of nitrogen.

The reactor was fed with the prepolymer prepared previously at a rate of 1200 g/h. Furthermore, it was continuously fed with chloroform in proportions such that the molar ratio of the quantities of chloroform to titanium introduced into the reactor was varied as shown in Table 1.

TABLE 1

| Run | Molar ratio of chloroform to titanium | Titanium residue in the copolymer (ppm)(1) | Copolymer rate (kg/h) | Catalyst activity (g/mM/h/0.1MPa) |
|---|---|---|---|---|
| A (comparative) | 0 | 22 | 82 | 58 |
| B | 0.043 | 17 | 80 | 77 |
| C | 0.068 | 17 | 80 | 77 |
| D | 0.091 | 17 | 80 | 74 |
| E (comparative) | 0.176 | 25 | 64 | 41 |
| F (comparative) | 0.281 | 40 | 57 | 26 |

(1) ppm: part per million by weight.

The analysis of the Runs disclosed in Table 1 shows that the catalyst activity in Runs B, C and D was substantially increased (about +30%) in comparison with Run A (comparative) wherein no chloroform was used. The catalyst activity drastically fell down in Runs E (comparative) and F (comparative). FIG. 2 shows a graph of the catalyst activity (expressed in g/mM/h/0.1 MPa) versus the molar ratio of chloroform to titanium representing Runs A to F.

EXAMPLE 4
a) Preparation of a Catalyst

The operation was carried out exactly as in Example 3.

b) Preparation of a Prepolymer

The operation was carried out exactly as in Example 3, apart from using 4 moles of tri-n-octylaluminium.

c) Manufacture of a polyethylene

The operation was carried out exactly as in Example 3, apart from using a reaction gas mixture having the following composition by volume 38.9% of ethylene, 42.8% of hydrogen and 18.3% of nitrogen.

The reactor was fed with the prepolymer prepared previously at a rate of 960 g/h. Furthermore, it was continuously fed with chloroform in proportions such that the molar ratio of the quantities of chloroform to titanium introduced into the reactor was varied as shown in Table 2.

TABLE 2

| Run | Molar ratio of chloroform to titanium | Titanium residue in the copolymer (ppm)(1) | Copolymer rate (kg/h) | Catalyst activity (g/mM/h/0.1MPa) |
|---|---|---|---|---|
| G (comparatif) | 0 | 15 | 86 | 78 |
| H | 0.031 | 11 | 100 | 126 |
| I | 0.052 | 10 | 120 | 143 |
| J | 0.085 | 9 | 128 | 154 |

(1) ppm: part per million by weight.

The analysis of the runs disclosed in Table 2 shows that the catalyst activity in Runs H, I and J was substantially increased (from 61 to 97%) in comparison with Run G (comparative) wherein no chloroform was used.

EXAMPLE 5
a) Preparation of a Catalyst

The operation was carried out exactly as in Example 1(a).

b) Preparation of a Prepolymer 500 liters of n-hexane, 2.5 moles of tri-n-octylaluminium and a quantity of previously prepared catalyst containing 2.5 moles of titanium were introduced into a 1.5-m$^3$ stainless steel reactor maintained under nitrogen atmosphere, provided with a stirring device rotating at 150 revolutions per minute and heated to 70° C. Hydrogen was then introduced into it so as to obtain a partial pressure of 0.1 MPa, and ethylene at a steady flow rate of 15 kg/h for 5 hours and 50 minutes. At the end of this time the reactor was degassed and its content was transferred into a mechanically stirred evaporator in which the n-hexane was removed by a circulation of nitrogen heated to 70° C. 87.5 kg of a prepolymer containing 35 g of polyethylene per millimole of titanium were then obtained.

c) Manufacture of a Copolymer of ethylene and 1-hexene

The operation was carried out in a reactor identical with that of Example 1(c). The reactor contained a fluidized bed of particles of polymer being formed which had a height of 2.5 m and through which passed a stream of reaction gas mixture which had an upward velocity of 45 cm/s, an absolute pressure of 1.6 MPa and a temperature, measured at the outlet of the disengagement chamber, of 80° C.

The reaction gas mixture comprised, by volume, 37% of ethylene, 7.0% of 1-hexene, 6.3% of hydrogen and 49.7% of nitrogen.

The reactor was fed with previously prepared prepolymer at a rate of 350 g/h. It was fed separately with triethylaluminium at a rate of 20 millimoles per hour. Furthermore, it was continuously fed with chloroform at a rate of 0.5 millimoles per hour. The molar ratio of the quantities of chloroform and of titanium introduced into the reactor was therefore 0.05.

Under these conditions an ethylene polymer free from agglomerate was drawn off at a rate of 80 kg/h, which had a density of 0.9175, a titanium content of 6 ppm, a melt index MI$_{2.16}$ of 0.8 g/10 minutes, a content of soluble material of 1.6% and which contained approximately 10% by weight of 1-hexene. The catalyst activity was 450 g/mM/h/0.1 MPa.

EXAMPLE 6 (COMPARATIVE)
Manufacture of a Copolymer of ethylene and 1-hexene

The operation was carried out exactly as in Example 5(c) except for the fact that no chloroform was employed. Under these conditions the catalyst activity was 240 g/mM/h/0.1 MPa. The polymer obtained had a melt index $MI_{2.16}$ of 0.55 g/10 minutes and a content of soluble material of 2.9%.

EXAMPLE 7
a) Preparation of a Catalyst

In a fluidised bed reactor, a microspheroidal silica powder sold under the trademark "ES 70" R by Joseph Crosfield and Sons (Great-Britain) was subjected during 12 hours to a thermal treatment at 870° C. under a stream of nitrogen. At the end of this period, the silica powder thus obtained was cooled to the ambiant temperature (20° C.) and maintained under a nitrogen atmosphere.

Into a 240 liter stainless steel reactor fitted with a stirring device rotating at 166 revolutions per minute, were introduced at the ambient temperature 20 kg of the silica powder previously prepared and n-hexane to produce a suspension of 110 liters, and then at 50° C. 16 moles of hexamethyldisilazane. The suspension thus obtained was kept stirred during 4 hours at 80° C. It contained a solid which was washed five times, each time with 130 liters of n-hexane at 50° C.

30 moles of dibutylmagnesium were then introduced during 2 hours at 50° C. into the reactor. The suspension thus obtained was kept stirred during 1 hour at 50° C. It contained a solid product having 1.5 millimoles of magnesium per 1 gram of silica.

Into the reactor containing the solid product in suspension in n-hexane heated at 50° C., were introduced 60 moles of tertiobutyl chloride in 2 hours. At the end of this period, the suspension thus obtained was stirred during 1 hour at 50° C. It contained a solid product which was washed three times, each time with 130 liters of n-hexane at 50° C.

Into the reactor maintained at 50° C., were introduced 6 moles of triethylorthoacetate. The suspension thus obtained was kept stirred during 1 hour at 50° C.

12 moles of trimethylaluminium were then introduced into the reactor at 50° C. The suspension thus obtained was kept stirred during 2 hours at 80° C.

Into the reactor cooled at 50° C., 3 moles of titanium tetra-n-butoxide and 3 moles of titanium tetrachloride were introduced. The suspension thus obtained was kept stirred during 2 hours at 80° C., then was cooled at 20° C. It contained a solid catalyst which was washed five times, each time with 130 liters of n-hexane at 20° C. The catalyst contained per 1 gram of silica 1.5 millimoles of magnesium, 3 millimoles of chlorine and 0.3 millimole of titanium.

b) Preparation of a Prepolymer 450 liters of n-hexane, 15 g of an antistatic composition "ASA 3" R sold by Shell (Holland) containing 0.55% by weight of chromium and calcium, a quantity of the catalyst previously prepared containing 2 moles of titanium and 8 moles of tri-n-octylaluminium were introduced into a 1-m³ stainless steel reactor fitted with a stirring device rotating at 140 revolutions per minute. Into the catalyst suspension heated to 70° C. were introduced hydrogen so as to obtain a partial pressure of 0.1 MPa and ethylene at a steady flow rate of 15 kg/h for 5 hours and 20 minutes. At the end of this period, the prepolymer suspension thus obtained was transferred into a mechanically stirred evaporator in which the n-hexane was removed by a circulation of nitrogen heated to 70° C. 80 kg of a prepolymer were thus obtained having a mean diameter of 90 microns and a bulk density of 0.45 g/cm³.

c) Manufacture of a Copolymer of ethylene and 1-hexene

The operation was carried out exactly as in Example 1, apart from using the prepolymer previously prepared and a reaction gas mixture comprising by volume 30% of ethylene, 4.2% of 1-hexene, 6% of hydrogen and 59.8% of nitrogen.

The reactor was fed with the prepolymer previously prepared at a rate of 160 g/h. It was fed separately with trimethylaluminium at a rate of 22.6 millimoles per hour. Furthermore, it was continuously fed with chloroform at a rate such that the molar ratio of the quantities of chloroform to titanium introduced into the reactor was 0.08.

Under these conditions a copolymer free from agglomerate was drawn off at a rate of 85 kg/h with a density of 0.917, a melt index $MI_{2.16}$ of 1.0 g/10 minutes and a mean diameter of 920 microns. The catalyst activity was 1160 g of polymer per millimole of titanium, per hour of reaction and per 0.1 MPa of ethylene pressure (g/mM/h/0.1 MPa).

EXAMPLE 8 (COMPARATIVE)
Manufacture of a Copolymer of ethylene and 1-hexene

The operation was carried out exactly as in Example 7 apart from not using chloroform. Under these conditions, the catalyst activity was 820 g/mM/h/0.1 MPa. The copolymer had a density of 0.919, a melt index $MI_{2.16}$ of 1.1 g/10 minutes and a mean diameter of 790 microns.

EXAMPLE 9
a) Preparation of a Magnesium Chloride Support 8.1 1 (40 moles) of diisoamyl ether (DIAE) were introduced at ambient temperature (20° C.) and under nitrogen atmosphere into a 300-l stainless steel reactor provided with a stirring system rotating at 150 revolutions per minute and containing 80 moles of dibutylmagnesium in solution in 133 l of n-hexane. The reactor was maintained at 30° C. 19.3 l (176 moles) of tert-butyl chloride were introduced into it over 12 hours. The mixture was then kept stirred for 2 hours at 30° C. The solid product obtained was washed 7 times, each time with 130 liters of n-hexane at 30° C. 80 moles of magnesium chloride were thus obtained in the form of spherical particles which had a mean diameter of 26 microns, a particle size distribution Dm/Dn of 1.5 and a DIAE/Mg molar ratio of 0.103 and a Cl/Mg molar ratio of 2.17.

b) Preparation of a Catalyst 110 l of n-hexane containing 70 moles of previously prepared magnesium chloride were introduced under nitrogen atmosphere into a 300-liter stainless steel reactor provided with a stirring system rotating at a rate of 160 revolutions per minute. The reactor was heated to 70° C. for 1 hour. The solid thus obtained was washed twice, each time with 130 l of n-hexane at 70° C. and then twice, each time with 130 l of n-hexane at 25° C. With the reaction temperature at 25° C., 18.9 l of n-hexane containing 35 moles of ethanol and 7 moles of triethyl orthoacetate were introduced into it. The reactor was then kept stirred at a temperature of 25° C. for 1 hour. At the end of this time the solid product obtained was washed 4 times, each time with 130 l of n-hexane at 25° C. and the volume of suspension was then returned to 110 l by removing a portion of n-hexane. The reactor was then heated to 50° C. and 80 l of n-hexane containing 70 moles of triethylaluminium were introduced into it over 1 hour. After continuing to maintain the stirring for 1 hour and the temperature at 50° C. the solid product obtained was washed 3 times, each time with 130 l of n-hexane at 50° C. and 6 times, each time with 130 l of n-hexane at 25° C. and the volume of suspension was returned to 110 l by removing a portion of n-hexane. 32 l of n-hexane containing a mixture consisting of 7 moles of titanium tetrachloride and 7 moles of titanium tetra-n-propoxide were then introduced into the reactor over 1 hour. The reactor was then kept stirred at 80° C. for 1 hour. At the end of this time the solid product obtained was washed twice, each time with 130 l of n-hexane at 80° C., then twice, each time with 130 l of n-hexane at 5° C. and 5 times, each time with 130 l of n-hexane at 25° C. A catalyst which had the following characteristics was then obtained:

| titanium/magnesium molar ratio | 0.109 |
| aluminium/magnesium molar ratio | 0.007 |
| trivalent titanium/total titanium molar ratio | 0.45 |
| chlorine/magnesium molar ratio | 2.25 |
| DIAE/magnesium molar ratio | 0 | c) Preparation of a Prepolymer

Into a 1 m³ stainless steel reactor, equipped with a jacket and a stirrer rotating at 140 revolutions per minute were successively introduced 450 liters of n-hexane, 15 g of an antistatic composition "ASA-3" R sold by Shell (Holland), containing 0.55% by weight of chromium and calcium, a quantity of previously prepared catalyst corresponding to 3 moles of titanium and, finally, 4.8 moles of tri-n-octylaluminium. The catalyst suspension thus prepared was heated to 70° C. and hydrogen was then introduced into it so as to obtain a partial pressure of 0.1 MPa and, over 6 hours, a mixture containing 70% by volume of ethylene and 30% of hydrogen at a steady rate of 20 kg/h. At the end of the prepolymerization reaction the prepolymer suspension obtained was cooled to 60° C. 120 kg of prepolymer which had excellent dry flow properties, a weight-mean diameter of 80 microns and a bulk density of 0.49 g/ml were recovered.

d) Copolymerization of ethylene and 1-hexene 100 kg of an anhydrous polyethylene powder were introduced under nitrogen atmosphere into a reactor of 75 cm diameter containing a fluidized bed of 75 cm diameter, as a polymer charge originating from a preceding reaction. A gaseous mixture heated to 80° C. was then introduced into it, consisting of hydrogen, ethylene, 1-hexene and nitrogen and propelled at an upward velocity of 44 cm/s. The partial pressures of the constituents of this mixture were:

| hydrogen | 0.072 MPa |
| ethylene | 0.425 MPa |
| 1-hexene | 0.064 MPa |
| nitrogen | 1.140 MPa |

The prepolymer obtained previously was then introduced into this reactor at a rate of 120 g per hour, and triethylaluminium at a rate of 22 millimoles per hour. Chloroform was continuously introduced at a rate of 0.24 millimoles per hour. As a result, the molar ratio of the quantities of chloroform and titanium introduced into the reactor was 0.08. The catalyst activity was 1070 g/mM/h/0.1 MPa and, after the polymerization conditions had stabilized, a copolymer powder which had the following was obtained at a rate of 70 kg/h:

a bulk density: 0.37 g/cm³ a melt index $M_{2.16}$: 0.9 g/10 minutes a flow parameter n: 1.5 a density: 0.918 a weight-mean diameter: 700 microns a content of fines which had a diameter smaller than 125 microns: 0.1% by weight a titanium content: 2 ppm a width of the molecular mass distribution: 3.9

EXAMPLE 10 (COMPARATIVE)

Copolymerization of ethylene and 1-hexene

The operation was carried out exactly as in Example 9 (d) except for the fact that no chloroform was employed during the copolymerization reaction. Under these conditions the catalyst activity was 720 g/mM/h/0.1 MPa.

I claim:

1. Process for increasing the catalyst activity of a gas-phase (co-)polymerisation of ethylene or ethylene with at least one $C_3$–$C_8$ olefin, comprising introducing into the gas-phase (co-)polymerisation medium the olefin(s), a titanium based catalyst of the Ziegler-Natta type essentially containing atoms of titanium, halogen and magnesium, and optionally a refractory oxide, and an alkylaluminium cocatalyst, wherein the (co-)polymerisation is conducted continuously in the gas phase and a mono- or polyhalogenated saturated hydrocarbon compound is continuously introduced into the gas-phase (co-)polymerisation medium in an amount such that the molar quantity of the mono- or polyhalogenated saturated hydrocarbon compound to that of titanium introduced into the gas-phase polymerisation medium is from 0.03 to 0.095.

2. Process according to claim 1, characterized in that the halogenated hydrocarbon compound is introduced in a quantity such that the molar ratio of the quantity of the halogenated hydrocarbon compound to that of titanium introduced into the polymerization medium is in the range from 0.031 to 0.091.

3. Process according to claim 1, characterized in that the alkylaluminum cocatalyst is introduced in a quantity such that the molar ratio of the quantity of the halogenated hydrocarbon compound to that of the alkylaluminum cocatalyst introduced into the polymerization medium is comprised between 0.001 and 0.5.

4. Process according to claim 1, characterized in that the halogenated hydrocarbon is selected amongst the group consisting of methylene chloride, chloroform, carbon tetrachloride, trichloro-1,1,1 ethane and dichloro-1,2 ethane.

5. Process according to claim 1, characterized in that the catalyst is prepared by a method comprising:

(1) a reaction between a magnesium metal, a halogenated hydrocarbon and at least one tetravalent titanium compound, (2) or bringing a granular support into contact with (a) a dialkylmagnesium and optionally a trialkylaluminium, (b) a halogenated hydrocarbon and (c) a tetravalent titanium compound, (3) or bringing a magnesium chloride support into contact with (a) an alkylaluminum compound suitable for reducing a titanium compound and (b) a tetravalent titanium compound.

6. A process as defined in claim 1 wherein said polyhalogenated hydrocarbon is chloroform.

* * * * *

UNITED STATES PATENT AND TRADEMARK OFFICE
CERTIFICATE OF CORRECTION

PATENT NO. : 5,990,251

DATED : November 23, 1999

INVENTOR(S) : EMMANUEL GELUS

It is certified that error appears in the above-identified patent and that said Letters Patent is hereby corrected as shown below:

Title page, before "[51]" insert:

--[30] Foreign Application Priority Data
          July 13, 1993    France    93/08919

Column 6, line 65, "$M_{2.16}$" should read --$MI_{2.16}$--.

Column 11, line 11, "5°C" should read --50°C--; line 65, "$M_{2.16}$" should read --$MI_{2.16}$--.

Signed and Sealed this

Thirteenth Day of June, 2000

*Attest:*

Q. TODD DICKINSON

*Attesting Officer*      *Director of Patents and Trademarks*